Aug. 27, 1957 — M. PRICE — 2,804,344
HOSE NOZZLES
Filed July 25, 1956
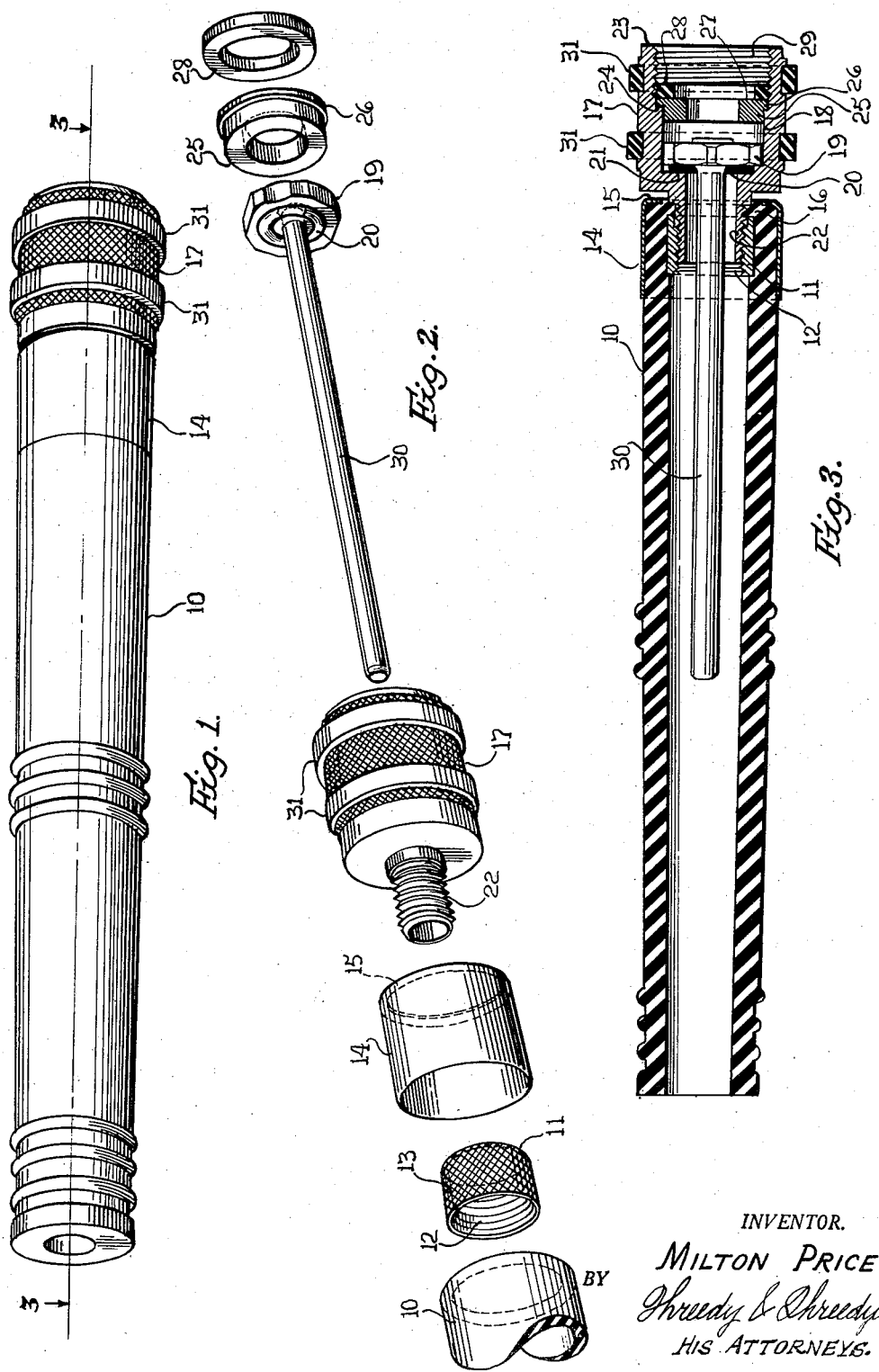
INVENTOR.
MILTON PRICE
BY Shreedy & Shreedy
HIS ATTORNEYS.

United States Patent Office 2,804,344
Patented Aug. 27, 1957

2,804,344

HOSE NOZZLES

Milton Price, Chicago, Ill., assignor to Milton Manufacturing Co., Inc., Chicago, Ill., a corporation of Illinois Application July 25, 1956, Serial No. 600,101

2 Claims. (Cl. 299—149)

This invention relates to certain new and useful improvements in hose nozzles.

An object of the inventon is the provision of a nozzle construction adapted for attachment to a hose and in which a valve confining chamber includes a retaining member of ring formation press-fitted into the chamber with a limiting flange cooperating with an integral shoulder for spacing the member from the opposite wall of the chamber and in which such member serves the additional function of providing a seat for a sealing washer.

Another object of the invention resides in the novel arrangement of the nozzle parts which are relatively simple in construction, permitting expeditious assembly which results in economical manufacture of the nozzle.

A further object of the invention is the provision of a nozzle construction for a hose, in which the parts are so interrelated with respect to each other as to eliminate the necessity of many of the usual and conventional operations employed for the assembly of nozzle constructions now commercially in use.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of a hose nozzle embodying my improvements;

Fig. 2 is a perspective view of the parts of the hose nozzle showing the same in exploded relation with respect to each other;

Fig. 3 is a sectional detail view of the hose nozzle taken substantially on line 3—3 of Fig. 1.

The several objects of my invention are accomplished preferably by the preferred form of construction shown in the accompanying drawings and in which drawings my improved hose nozzle includes a flexible tube 10 formed of such material as will best serve the purpose. In one end of the tube 10 is positioned a bushing 11 threaded internally as at 12. This bushing 11 on its exterior surface is knurled as at 13. The bushing 11 is press-fitted into the end of the tube 10. A metal sleeve 14 embraces the end of the tube 10 into which the bushing 11 is inserted. This sleeve 14 has a flange 15 which is formed by a rolling operation and pressed against the adjacent end of the tube 10 to compress that portion of the tube 10 indicated at 16 over the bushing 11, thereby to prevent displacement of the bushing 11 from the tube 10. A valve housing is indicated at 17. This valve housing 17 provides a valve chamber 18 in which is movably arranged a valve disc or head 19 having a gasket or other sealing ring 20 on one side thereof and engageable with the valve seat 21 provided by the housing 17 whereby to provide an effective seal when the valve disc 19 is in its closed position. The valve housing 17 provides an integral nipple 22 threaded externally for threaded engagement into the bushing 11, whereby to provide an effective connection between the housing 17 and the tube 10.

Within the valve housing 17 inwardly of its outer end portion 23 is an annular shoulder 24. A retainer ring 25 is press-fitted into the valve housing 17 to retain the valve disc 19 within a valve chamber 18. This retainer ring 25 is provided with an annular flange 26 which is adapted to engage the shoulder 24 to limit the distance of insertion of the retainer ring 25 within the valve chamber 18. The outer surface 27 of the retainer ring 25 provides a seat for a sealing washer 28. The valve housing 17 at one end is provided with threads 29 by means of which the nozzle is attached to the coupling of a hose or the like.

The retainer ring 25 being press-fitted into the valve housing 17 may be assembled in position by a simple operation requiring no threads for its connection to the valve housing or any tools other than the tool necessary to drive the retainer ring into position with its flange 26 engaging the shoulder 24.

The valve disc 19 is carried by an elongated stem 30 which projects into the tube 10. Under water pressure, the valve disc 19 will be pressed against the valve seat 21 and thereby shut off the flow of water through the tube 10. However, the valve disc 19 is unseated from the valve seat 21 by flexing the tube 10 from either side of its long axis. The flexing of such tube 10 will tilt the stem 30 from its position shown in Fig. 3, to a position with the valve disc 19 unseated from the valve seat 21, thereby to permit the flow of water through the tube 10.

My improved nozzle is especially useful in washing automobiles. In this connection, the water will only flow through the nozzle as long as the user thereof holds the tube 10 in a flexed position. Upon return of the tube 10 from flexed position, the valve disc 19 will automatically under water pressure return to sealing position with respect to its valve seat 21. To prevent marring or scratching of the surface of the automobile, I provide spaced rings 31 upon the exterior surface of the valve housing 17. These rings 31 are made from rubber or other like material and prevent the valve housing from coming into contact with the surface of the automobile.

The relatively few parts employed in the construction of my hose nozzle permit the same to be readily assembled by one other than a skilled mechanic. This results in the production of a hose nozzle which is not only highly efficient in use but one which may be manufactured at an economical cost.

The relative position of the retainer ring 25 within the valve housing 17 provides a maximum chamber for the valve head, thus permitting the free flow of water through the tube 10 in a substantial volume.

The novel and unique assembly of the several parts making up my improved hose nozzle results in a hose nozzle which is leakproof and one which is capable of withstanding rough usage.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A hose nozzle comprising an elongated pipe formed of flexible material and adapted to be flexed on either side of its long axis, a bushing press-fitted into one end of said pipe, a sleeve embracing said end of said pipe and having an edge thereof rolled to compress said end of said pipe against the adjacent end of said bushing, said sleeve being of a length greater than said bushing so as to extend therebeyond when said pipe is mounted therebetween so as to prevent flexing of said pipe adjacent the end of said bushing, a valve housing having a nipple threaded into said bushing and providing a valve chamber, a valve disc arranged in said chamber and having an elongated stem extending through said bushing into said pipe, said valve housing at one end of said chamber providing an annular shoulder, a retainer ring press-fitted into said valve housing and having an annular flange abutting said shoulder.

2. A hose nozzle comprising an elongated pipe formed of flexible material and adapted to be flexed on either side of its long axis, a bushing press-fitted into one end of said pipe, a sleeve embracing said end of said pipe and having an edge thereof rolled to compress said end of said pipe against the adjacent end of said bushing, said sleeve being of a length greater than said bushing so as to extend therebeyond when said pipe is mounted therebetween so as to prevent flexing of said pipe adjacent the end of said bushing, a valve housing having a nipple threaded into said bushing and providing a valve chamber, a valve disc arranged in said chamber and having an elongated stem extending through said bushing into said pipe, said valve housing at one end of said chamber providing an annular shoulder, a retainer ring press-fitted into said valve housing and having an annular flange abutting said shoulder, said retainer ring serving as a seat for a sealing gasket positioned on the exterior side thereof.

References Cited in the file of this patent

UNITED STATES PATENTS

| | | |
|---|---|---|
| 157,840 | Kennedy | Dec. 15, 1874 |
| 2,015,923 | Davis | Oct. 1, 1935 |